US008363348B2

(12) United States Patent
Hirano et al.

(10) Patent No.: US 8,363,348 B2
(45) Date of Patent: Jan. 29, 2013

(54) PATTERNED MEDIA WITH STRUCTURED PES SERVO SEGMENTS ENCODING LOCAL TRACK POSITION

(75) Inventors: Toshiki Hirano, San Jose, CA (US); Jeffrey S. Lille, Sunnyvale, CA (US); Tetsuo Semba, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 145 days.

(21) Appl. No.: 12/924,880

(22) Filed: Oct. 7, 2010

(65) Prior Publication Data

US 2012/0087037 A1    Apr. 12, 2012

(51) Int. Cl.
*G11B 5/09* (2006.01)
*G11B 5/596* (2006.01)

(52) U.S. Cl. .................... 360/77.08; 360/48
(58) Field of Classification Search .............. None
See application file for complete search history.

(56) References Cited

U.S. PATENT DOCUMENTS

| | | | |
|---|---|---|---|
| 6,643,082 | B1 | 11/2003 | Belser |
| 7,009,791 | B2 | 3/2006 | Shimatani |
| 7,012,773 | B2 | 3/2006 | Ashikaga et al. |
| 7,612,961 | B2 | 11/2009 | Yamamoto |
| 7,821,738 | B2 * | 10/2010 | Ito et al. .................... 360/135 |
| 2008/0239906 | A1 | 10/2008 | Akagi et al. |
| 2008/0266701 | A1 | 10/2008 | Albrecht et al. |
| 2009/0097160 | A1 | 4/2009 | Yamamoto |
| 2009/0166321 | A1 | 7/2009 | Albrecht et al. |
| 2009/0168229 | A1 | 7/2009 | Albrecht et al. |
| 2010/0128583 | A1 | 5/2010 | Albrecht et al. |
| 2010/0165512 | A1 | 7/2010 | Albrecht et al. |

FOREIGN PATENT DOCUMENTS

| | | |
|---|---|---|
| JP | 2005174429 A1 | 6/2005 |
| JP | 008204509 A1 | 9/2008 |
| WO | WO2008105334 A1 | 9/2008 |

OTHER PUBLICATIONS

Xiaodong Che, "Study of Lithographically Defined Data Track and Servo Patterns," IEEE Transactions on Magnetics, vol. 43, No. 12, Dec. 2007, pp. 4106-4112.
M. Nishikawa, "Potential of Servo Pattern Printing on PMR Media with High-Density Servo Signal Pattern," IEEE Transactions on Magnetics, vol. 42, No. 10, Oct. 2006, pp. 2612-2614.
M.T. Moneck, "Lithographically Patterned Servo Position Error Signal Patterns in Perpendicular Disks," Journal of Applied Physics 103, 07C511 (2008), 3 pages.
T. Hamaguchi, "An Accurate Head-positioning Signal for Perpendicular Recording Using a DC-free Servo Pattern," Journal of Applied Physics, vol. 91, No. 10, May 15, 2002, pp. 8697-8699.

* cited by examiner

*Primary Examiner* — Regina N Holder
(74) *Attorney, Agent, or Firm* — G. Marlin Knight

(57) ABSTRACT

Patterned magnetic media are described in which the servo sectors include at least two PES offset segments that can be used for the position error signal (PES) and identification of local track position. The two PES offset segments deviate from the track centerline in opposite directions. The lengths of the offset PES offset segments are systematically varied in a repeating pattern to provide a unique servo signal pattern for each track in a local group of adjacent tracks. The locally unique servo sector pattern allows the servo system to use the pattern of the signals generated from the offset and non-offset segments to determine the local track position, which is similar to information provided by the low order Gray code bits in prior art designs. Therefore, the number of bits in the track ID code can be reduced.

20 Claims, 4 Drawing Sheets

PATTERNED MEDIA WITH STRUCTURED PES SERVO SEGMENTS ENCODING LOCAL TRACK POSITION

RELATED APPLICATIONS

This application refers the concepts of the following co-pending, commonly assigned applications. One is by Albrecht et al. bearing Ser. No. 12/345,799 which has a filing date of Dec. 30, 2008 and was published Jul. 1, 2010 as pub. no. 20100165512. A second one is by Albrecht et al. bearing Ser. No. 12/324,431 which has a filing date of Nov. 26, 2008 and was published May 27, 2010 as pub. no. 20100128583.

FIELD OF THE INVENTION

This invention relates generally to servo systems for information storage systems that use rotating recording disks with pre-patterned tracks.

BACKGROUND

Commercial magnetic disk drive areal densities now exceed 300 Gbits/sq. in., and track densities can be greater than 250,000 tracks per inch. Advanced servo techniques are required to further improve disk drive performance. At the needed track densities, the heads (sensors) must stay centered on the narrow tracks to within a tolerance on the order of a few nanometers as the disk rotates under the heads at thousands of rpm. The servo fields, which encode positional information, are permanently written onto the disk during the manufacturing process. The servo information is processed by an electronics control system that adjusts the physical position of the actuator on which the heads are mounted.

The process by which the position information is written onto the disks is referred to as servo writing. Conventionally servo writing has been performed by a dedicated device called a servowriter that is distinct from the disk drive itself. Another approach is have the disk drive heads write the servo information, which is called self-servo writing.

Conventional magnetic disks have continuous thin films in which the magnetic transitions are recorded, but one technique for improving areal densities is to pattern the films into discrete track media (DTM) in which the tracks are formed from continuous strips (concentric rings) of magnetic material separated by small gaps where the magnetic material has been removed. More recently bit-patterned media (BPM) have been proposed that use nanometer scale magnetic islands or dots arranged in tracks on the recording surface. Concentrically patterned BPM can be considered to be interchangeable with DTM in the following specification. DTM and BPM place constraints on servo pattern design, because arbitrary features may not be compatible with the appropriate fabrication methods. Required servo patterns may be more complex than the data patterns. For example, planarization constraints might require that all pre-patterned features are constructed of grooves and lands with common dimensions (i.e., servo patterns have the same land and groove dimensions as data tracks). The planarization constraint allows grooves to vary in orientation and absolute position, provided land and groove dimensions are generally fixed.

Patterned media is typically fabricated using nanoimprint lithography (NIL), which mechanically deforms the imprint resist to create patterns. A master template is used to fabricate a plurality of stamper tools that are then used for imprinting the substrates for the patterned media. The required servo patterns must be included in the master template. One method of fabricating patterned media templates grows self-assembly structures on top of a lithographically-defined template. For example e-beam lithography can be used to pattern holes for a master mold substrate. After the e-beam patterning, block copolymer self-assembly can be used to improve the uniformity of the e-beam dots and to fill-in missing dots. Self-assembled structure on the templates imposes constraints on the features that can be formed by filling in the gaps and minimizes the energy of the system. For example, asymmetric features, such as low order Gray code bits, may be incompatible with the constraints of self-assembly structures.

The servo data on the disk provides several fundamental functions and is conventionally arranged in distinct fields that are arranged in sequence in each servo sector along the direction of the track. First, it supplies a synchronizing timing mark (known as the Servo Track Mark (STM) or Servo Address Mark (SAM)). Next is a 10-30 bit digital field, which provides an integer track-ID (TID) number and additional information to identify the physical servo sector number. The TID is typically written in Gray code as the presence or absence of recorded dibits. During seek operations, when the head is rapidly moving across tracks, the head can typically only read a portion of the Gray-code in each TID. The Gray-code is constructed so that pieces of the TID, in effect, can be combined from adjacent tracks to give an approximate track location during a seek. The servo field also includes a position error field, which provides the fractional-track Position Error Signal (PES). During read or write operations the drive's servo control system uses the PES servo information recorded on the disk surface as feedback to maintain the head in a generally centered position over the target data track. The conventional PES pattern is called a quad-burst pattern in which the bursts are identical sets of high frequency magnetic flux transitions. Unlike the track-ID (TID) field number, the PES bursts do not encode numerical information. In contrast to the TID, it is the position of the bursts that provide information on where the head is relative to the centerlines of adjacent tracks. The quad-burst pattern is repeated for each set of two tracks, so only local (fractional) information is provided. Each servo wedge has four (A,B,C,D) sequential slots reserved for PES bursts. Each track has a centered PES burst in only one of the four slots. Thus, when the head is centered over a selected track, it will detect the strongest signal from a burst centered on the selected track, but it will also detect a weaker signal from bursts on the adjacent tracks. For example, when the head is centered over a track with a burst in the A-position, it might also detect a subsequent weak B-burst on the adjacent track on the right and then a weak D-burst from the adjacent track on the left. When the head passes over the PES pattern, the bursts that are within range generate an analog signal (waveform) that indicates the fractional position of the head over the disk and is used as feedback to adjust the position of the head. As the term "servo wedge" suggests, the downtrack dimension of the servo sectors increases toward the OD, because the linear velocity increases from the ID to the OD. This allows servo frequency to be keep constant. However, no information about the relative position of the track (the track ID) is encoded in the PES prior art.

Published US patent application 20100165512 by Albrecht et al. (Jul. 1, 2010) describes a method for forming a master pattern for patterned media, including features to support servo patterns. Block copolymer self-assembly is used to facilitate the formation of a track pattern with narrower tracks. The tracks include regions within each servo sector where the tracks are offset radially by a fraction of a track pitch, e.g. one half track. As one example, the offset portion of servo sector is self-written with A and B patterns on alternating tracks and a non-offset portion is self-written with C and D patterns on alternating tracks. The A-D patterns are magnetized in a self-servo writing operation, wherein the write head writes a burst (e.g., typically square wave) of alternating magnetization polarities.

Published US patent application 20100128583 by Albrecht; et al. (May 27, 2010) describes a servo writing method for patterned-media magnetic recording disk that uses a special position error signal (PES) alignment pattern located in each servo sector. The servo sectors include a synchronization (sync) field and a PES field that may include burst fields (A-D). The A-B fields are shown as being radially shifted by one-half track from the dots in fields C-D. The set of radial offsets for all of the servo sectors is used to modify or fine tune the gross feedforward correction signal that is applied during the servo writing process. This enables the servowriter write head to then precisely follow a track centerline so that the discrete islands in the PES fields can be magnetized according to the desired pattern.

Published US patent application 20090166321 by Albrecht, et al. (Jul. 2, 2009) describes formation of servo patterns for magnetic media that include self-assembly structures. The servo pattern is defined through lithographic processes while the data pattern is defined by a combination of lithographic processes and self-assembly. The servo regions may each include a sync field and plurality of burst fields (A-D), which in FIG. 3 are shown as including offset portions with the islands (dots) for the A and B bursts being generally positioned one half track offset from the respective track centerline. The A and B bursts are offset one track width from each other as well as being sequentially separated.

Published US patent application 20090097160 by Yamamoto (Apr. 16, 2009) describes a magnetic recording disk with pre-patterned servo sectors, wherein each data bit is stored in a magnetically isolated data island on the disk. The servo sectors include a synchronization pattern of generally radially directed discrete magnetized marks, and first and second position error signal (PES) fields of generally radially directed discrete magnetized stripes. Each stripe in each of the two fields comprises a plurality of radially spaced discrete servo islands, each island having a radial width of approximately Tp, where Tp is the radial spacing of the track centerlines. In each field, the servo islands in alternating stripes in the along-the-track direction are shifted radially by approximately Tp. In the first PES field, the islands are centered at the midline between two adjacent track centerlines, and in the second PES field the islands are centered at a track centerline. All of the servo islands in the two PES fields have the same magnetization direction.

Published US patent application 20090168229 by Albrecht; et al. describes a method of fabricating servo sectors of a patterned storage media with two arrays of discrete islands in a servo sector. The first array defines at least two burst fields. The second array also defines at least two burst fields. The second array is formed with a track-wise offset (i.e., an offset in the radial direction) from the first array. The offset between the first array and the second array may be about a half track offset, but the amount of offset between the arrays may vary depending on design preferences. Another step of the method comprises performing a servo writing process to define the polarity of the islands in the arrays. The servo writing process is performed by circumferentially writing one or more rows of islands to define the servo pattern in the servo sector. The servo pattern may be burst fields, sync fields, etc. The servo pattern generated by the servo writing process allows a quadrature signal to be generated when a read/write head passes over a track of the patterned storage media.

In U.S. Pat. No. 6,643,082 to Karl Belser (Nov. 4, 2003) a servo sector format for patterned media is described that includes a first patterned servo timing mark, a patterned Gray code, a plurality of PES burst separators (where no data can be written), and a second patterned servo timing mark. The first patterned servo timing mark indicates the start of a servo sector. A plurality of servo burst fields are written magnetically between the plurality of PES burst separators, and are used to determine at least one position error signal. The servo sector format further includes magnetically written Gray code positioned after the second servo timing mark. The patterned Gray code is used in addressing the tracks located on the surface of a disk when the magnetically written Gray code is self-written.

SUMMARY OF THE INVENTION

Embodiments of the invention describe patterned magnetic media comprising concentric tracks in which the servo sectors include at least two PES offset segments that can be used for the position error signal (PES) and identification of local track position. The first and second PES offset segments preferably deviate from the track centerline in opposite directions. The lengths of the offset segments are systematically varied in a repeating pattern to provide a unique servo signal pattern for each track in a local group of adjacent tracks. The selected group size can be thousands of tracks and, therefore, can be as large as a standard zone on a disk. The locally unique servo sector pattern allows the servo system to use the pattern of the signals generated from the offset and non-offset segments as an indication of the local track position, which is similar to information provided by the low order Gray code bits in prior art designs. Therefore, the number of bits in the track ID code can be reduced. In one embodiment the track ID code only identifies the PES zone.

By providing an alternative to using the low order Gray code bits and by limiting the change in lengths of the offset PES segments between adjacent track, embodiments of the invention are appropriate for use with media in which self-assembly is used in the fabrication process.

In one embodiment of the invention the first PES offset segment is written with a PES-B signal, the second PES offset segment is written with a PES-C signal and the PES-A signal and any other servo related signals including the track ID are written in non-offset portions of the servo sector. Symmetry can be broken by self-servo writing PES-B and PES-C in opposite polarities to further allow the servo system to distinguish these signals.

DETAILED DESCRIPTION OF THE INVENTION

Figure 1:
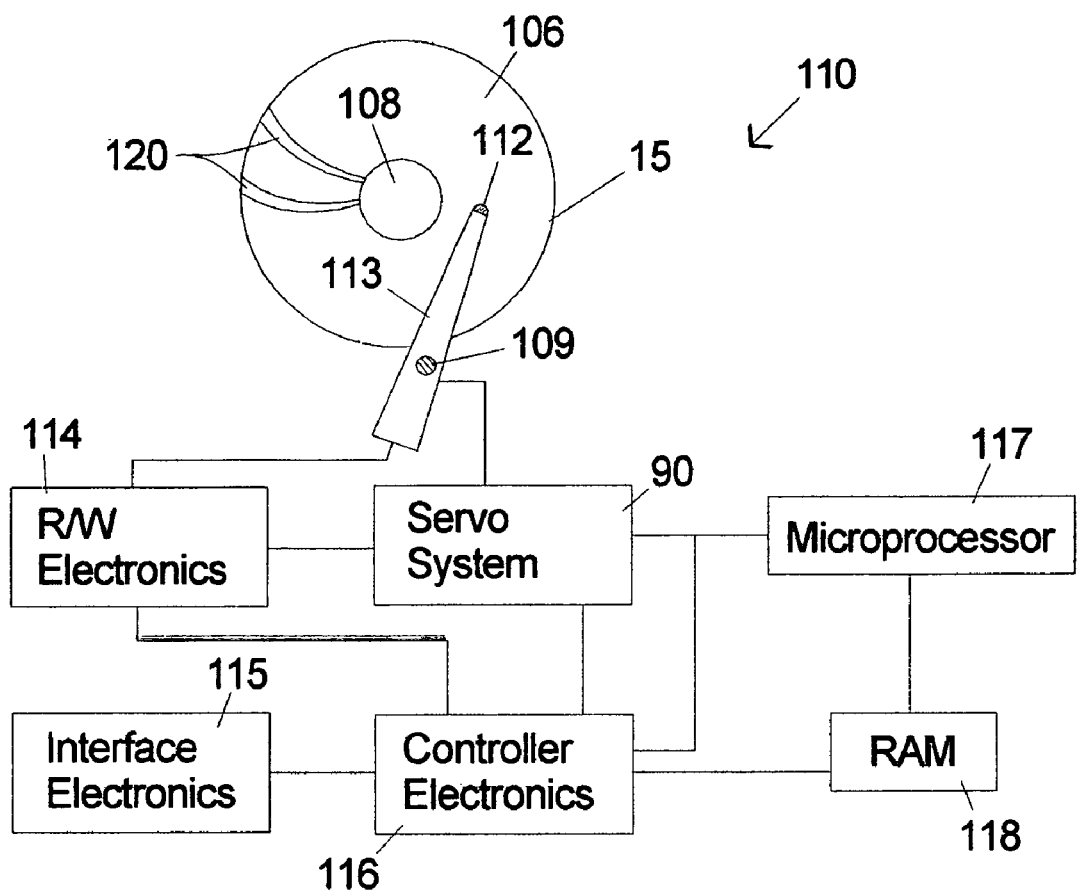
FIG. 1 is a block diagram illustrating selected components of an information storage system (disk drive) according to prior art in which the invention can employed.

The invention can be implemented in an information storage system (disk drive) that uses rotating disks coated with patterned thin film magnetic materials in discrete tracks and can be used with BPM. The invention is compatible with constraints imposed by the use of self-assembled features in the fabrication process. The basic system components of the disk drive are generally according to the prior art except as described herein. FIG. 1 is a block diagram illustrating selected components of an information storage system (disk drive) 110 according to prior art in which the invention can employed. The disk drive includes data recording disk 15 on which thin film ferromagnetic materials 106 have been patterned into discrete tracks (not shown). As in prior art practice a disk drive can contain multiple disks and sliders, but only one is shown. Actuator arm 113 is mounted to pivot around mounting point 109 by being driven conventionally by a voice coil motor (VCM) (not shown). Slider 112, which contains the read head (sensor) and write head (not shown), is attached to actuator arm 113. The electronics in the disk drive include servo system 90, read/write electronics 114, interface electronics 115, controller electronics 116, microprocessor 117, and RAM 118. A disk drive can include multiple disks stacked on hub 108 that is rotated by a disk motor (not shown), with a separate slider for each planar surface of each disk. The term servo wedge 120 will be used to mean the set of servo fields extending from ID to OD on the disk. As in the prior art, a disk 15 according to the invention will typically have multiple servo wedges 120 periodically arranged around the disk, but only two are shown. The data fields on each track extend between the servo sectors.

One problem for designing servo systems for patterned media with self-assembled features is that conventional low order bits of Gray code used for track IDs have asymmetric features that may not be compatible with self-assembled features on patterned media. Omitting the low order Gray code bits requires that some other means be provided to determine the local track position inside of a local group of tracks. Therefore, additional means for providing information about the local track location are needed. Embodiments of the invention provide this additional information.

Figure 2:
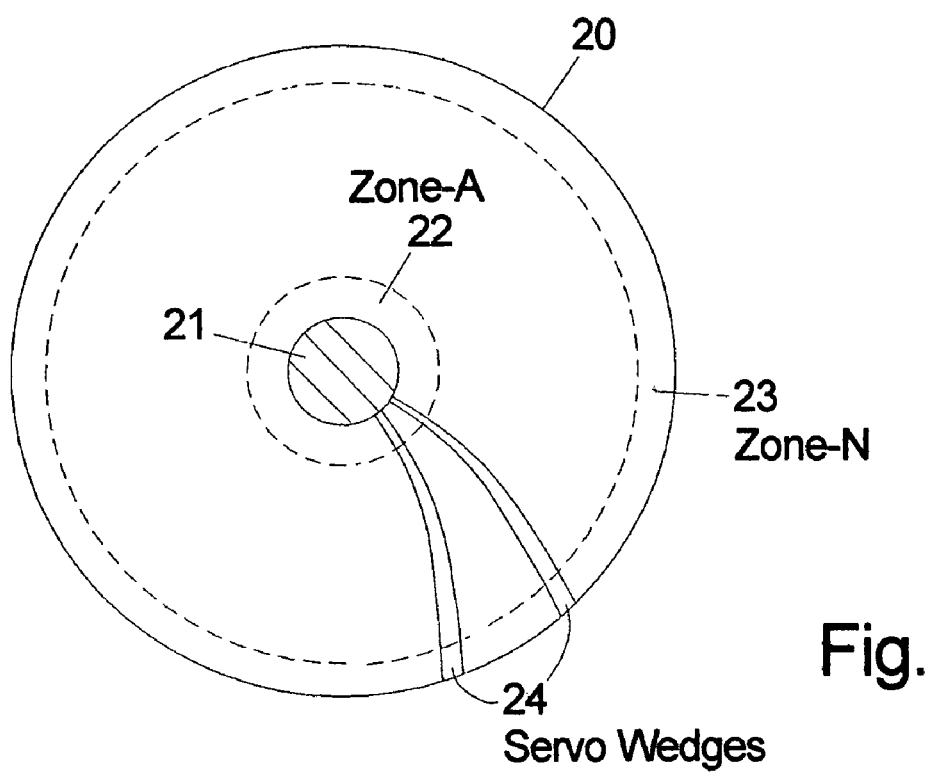
FIG. 2 is an illustration of PES zones of servo sectors on a patterned disk according to an embodiment the invention.

FIG. 2 is an illustration of selected features of disk 20 according to an embodiment the invention. The hole 21 is used for mounting the disk on the spindle or hub for rotation. The term "zone" 22, 23 will be used for a group of concentric tracks (not shown) in which the PES segments are constructed so that no two tracks have the same physical structure. A zone in this sense is not necessarily the same as a zone in zoned-bit recording (ZBR). As shown in FIG. 2, zone-A 22 is at the ID and zone-N 23 is at the OD. The intervening zones between the ID and OD are not shown. Every track would be in a zone. The size of the zones is not critical to the invention, but can be designed to be from a few tracks (e. g. 10) up to many thousands of tracks. The total number of zones on a disk decreases as the number of tracks in a zone increases. Typically a particular design will make each zone have the same number of tracks. Only two servo wedges 24 are shown, but as in the prior art, a plurality of servo wedges 24 would be periodically arranged around the disk.

Figure 3:
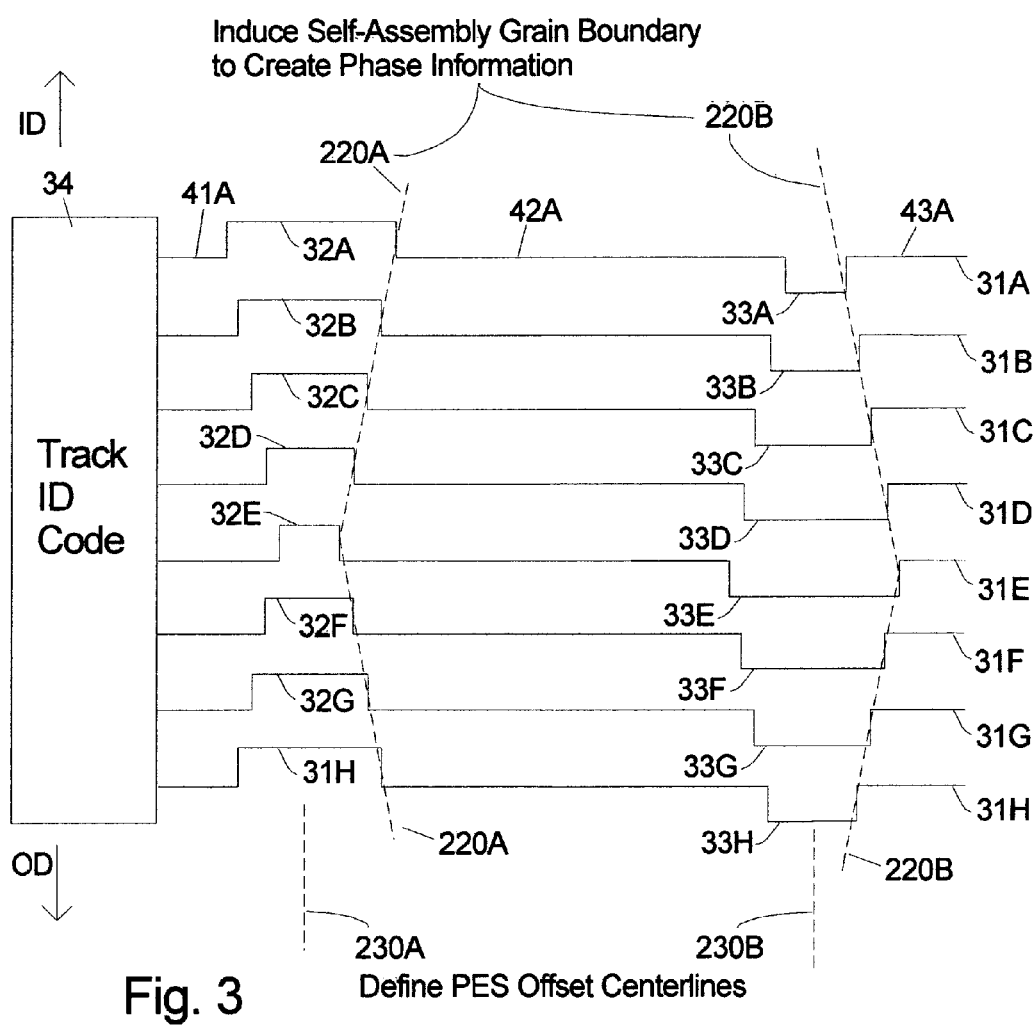
FIG. 3 is an illustration of a repeating pattern of PES offset portions in servo sectors of tracks on a patterned disk according to an embodiment the invention.

FIG. 3 is an illustration of selected servo sectors 31A-H of discrete tracks on a patterned disk 20 according to an embodiment the invention. The width of tracks are not shown in the figure for simplicity, but can any practical width for a discrete track of magnetic material according to the prior art. The patterns of the alternating lines can be formed using standard techniques such as e-beam lithography followed by the formation of self-assembly structures on templates that fill in the gaps (and minimize the energy of the system). The figure shows sections of the tracks which would move (rotate) under the read sensor (not shown) from right to left. As shown, the sensor flying over the rotating disk would first encounter the track ID code 34, then the PES sections 32A-H, 33A-H which would be followed by the data area (not shown).

As shown each servo sector includes a first offset segment which is offset from the data track centerline toward the ID (upward in the figure), which will be called an In-PES segment. In other embodiments the first offset segment can be shifted toward the OD. Preferably the two offset segments are shifted in opposite directions. The offset segment is shifted by a fraction of the track pitch, for example, one half of the centerline to centerline spacing (pitch) of the tracks. Thus, servo sector 31A includes an In-PES segment 32A which is offset toward the ID and a second PES offset segment 33A which is offset toward the OD, which will also be called a Out-PES segment 33A.

The servo sector 31A will be further described as an example. The track ID code 34 is followed by a non-offset segment 41A which is followed by In-PES offset segment 32A. Non-offset PES segment 42A separates the In-PES segment 32A from the Out-PES segment 33A. Non-offset PES segment 43A follows the second PES offset segment 33A. Although each of the servo sectors has the same number of segments as described above, the physical pattern of each one is unique within the group of tracks, e.g. 31A-H.

Each of the In-PES segments 32A-H have midpoints that are aligned on a first common centerline 230A to aid in conforming the design to the constraints of the self-assembly process by providing closures for the self-contained boundaries. Similarly the Out-PES segments 33A-H have midpoints that are also aligned on a second common centerline 230B. For the same reasons, the change in lengths from track to track of the In-PES and Out-PES segments is made to be relatively small. The offsets in the track result in induced "grain boundaries" 220A, 220B—breaks in the downtrack symmetry of the servo sectors. "Grain boundaries" refers to the cross-track symmetry breaking structure of the concentric tracks. Because of edge effects of an induced shift at the ID and OD of the disk, no recording should be done on the extreme tracks.

As shown in this embodiment the lengths of the In-PES segments 32A-E decrease monotonically with 32A being the longest and 32E being the shortest. After In-PES segment 32E, moving toward the OD, the In-PES segments begin increasing in length with In-PES segment 32F being longer than In-PES segment 32E and so forth. The dotted lines 220A, 220B illustrate that the magnitude of the grain boundary angle between the adjacent tracks has been held to a consistent value by keeping the relative changes in the size of the offset segments consistent from track to track.

As shown in this embodiment there are only five unique lengths of the In-PES segments, but many more unique lengths are possible in practical embodiments. The Out-PES segments begin with the shortest length 33A and steadily increase in length moving toward the OD with Out-PES segment 33E being the longest. After Out-PES segment 33E the length decreases with each track. Thus, in this embodiment the change in length of PES segments between adjacent tracks is to either the next smallest or the next largest length in the set of allowed lengths. Because the total length of the servo sector is essentially fixed for the local group, changes in the length of the In- and Out-PES segments are also reflected in opposite changes in the non-offset PES segments. The set (group) of eight adjacent tracks in FIG. 3 form a pattern which can be repeated over and over from the ID to the OD on a disk. The pattern has been selected so the beginning and ending lengths of both the In-PES and Out-PES segments are within the maximum change allowed by the self-assembly process.

Furthermore, the centerlines 230A, 230B show that the separation between the midpoints of the In-PES segments and the Out-PES segments is the same on adjacent tracks.

Because each servo sector in the set is physically unique, the signal generated in a read sensor flying over any circumferential (generally horizontal) path on this exemplary portion of the disk will likewise be unique. Thus, in principle the signal from the sensor can be mapped to a particular track within the group. The group size is limited by the ability of the servo system to uniquely resolve the signal generated by each pattern in the group. A practical embodiment could include thousands of unique combinations of the In-PES and Out-PES segments.

Figure 4:
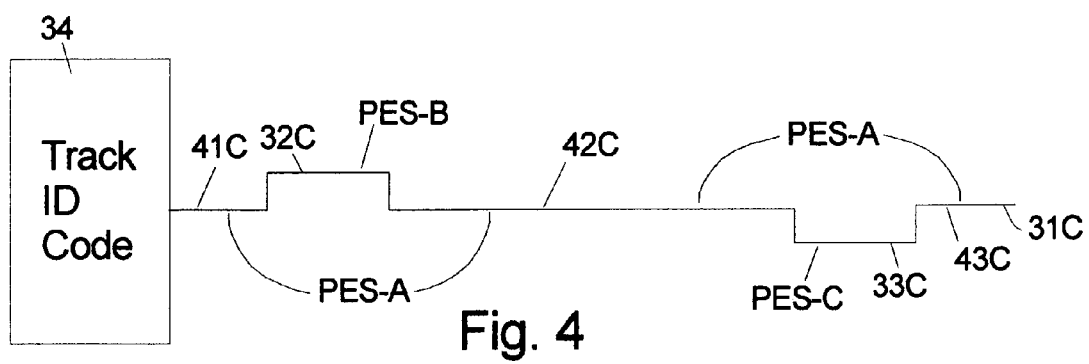
FIG. 4 is an illustration of PES signals written on servo sectors of tracks on a patterned disk according to an embodiment the invention.

The physical pattern of the PES offset segments as shown in FIG. 3 is formed in the thin film magnetic material when the disk is fabricated. Additional servo information is preferably self-written after the disk is assembled into a completed disk drive. For example, the track ID code is preferably self-written by the disk drive. In addition PES signals can be self-written to establish the fractional track PES function of the servo system. FIG. 4 is an illustration of PES sections of a servo sector according to an embodiment of the invention that includes self-written PES servo signal types A, B and C. The PES signals can be DC or selected AC frequencies. The self-servo written content of the PES signal can be read with a high band pass filter to only register the AC signals. Symmetry is broken by self servo write portions of the offset lines at either DC or different AC frequencies.

One PES scheme that can be employed in embodiments of the invention uses an A-B-A A-C-A sequence of PES signals where the B signal is written on the first or In-PES offset segment and the C signal is written on the second or Out-PES offset segment. Symmetry is broken by self-servo writing B and C in opposite polarities. The PES-A signal is written on the non-offset portions in this embodiment. It is an advantage of the invention that a PES composite signal can be derived according to prior art principles. The PES composite signal can be generated to indicate fractional track position in relation to the track centerline and reach a minimum or null value when the sensor is traveling on the track centerline.

Additional servo information such as preamble or synchronization timing marks can be written on the non-offset segments as needed.

In one alternative embodiment the PES servo signals can be written in half steps in the PES section. For example, the non-offset portions 41C, 42C, 43C could written with the selected signal for the PES-A in only one half of the segment as shown in the figure. Similarly one half of the PES-B offset segment could be written with the selected signal for the PES-B. The Out-PES segment 33C is written with the selected signal for the PES-C in one half.

While the present invention has been shown and described with reference to particular embodiments, the invention is limited in scope only as specified in the appended claims.

The invention claimed is:

1. A disk drive comprising:
    a slider including a read sensor and a write head;
    a servo system; and
    a rotatably mounted disk accessible by the read sensor and the write head, the disk having a set of tracks formed from concentric rings of thin film magnetic material separated by areas having no magnetic material, each track in the set including a plurality of servo sectors having at least first and second offset servo field segments, a centerline of the first and second offset servo field segments being offset from a track centerline, the set of tracks including a first group of adjacent tracks in which lengths of the first and second offset segments are selected from a set of five or more lengths and systematically change from track to track in a selected pattern to provide a unique servo signal pattern for each track in the first group of adjacent tracks and wherein the first group of tracks includes eight or more tracks.

2. The disk drive of claim 1 wherein the first and second offset servo field segments are disposed on opposing sides of the track centerline with one offset servo field segment being offset toward the inner diameter of the disk and the other offset servo field segment being offset toward the outer diameter of the disk.

3. The disk drive of claim 1 wherein midpoints of the first offset servo field segments are aligned along a first common centerline in each servo sector.

4. The disk drive of claim 3 wherein midpoints of the second offset servo field segments are aligned along a second common centerline in each servo sector.

5. The disk drive of claim 1 wherein the concentric rings include patterned magnetic islands in a concentric track arrangement.

6. The disk drive of claim 1 wherein the lengths of the first offset servo field segment systematically change from track to track by no more than a maximum amount by having adjacent tracks have either a next longer length or a next shorter length selected from a set of allowed lengths.

7. The disk drive of claim 1 wherein the set of tracks comprises a plurality of groups of tracks with each group of tracks having the selected pattern of lengths of the first and second offset servo field segments.

8. The disk drive of claim 1 wherein the servo sectors include a track ID field that identifies a coarse track position and the unique servo signal pattern for each track in the first group of adjacent tracks identifies a local track position.

9. The disk drive of claim 1 wherein a magnitude of a grain boundary angle between the first offset servo field segments on adjacent tracks is approximately constant for each adjacent pair of tracks in the group.

10. The disk drive of claim 1 wherein the servo sectors include a PES-A signal written on a non-offset portion of the servo sector which is aligned with the track centerline, a PES-B signal written on the first offset servo field segment and PES-C signal written on the second offset servo field segment.

11. The disk drive of claim 1 wherein a PES signal written on the first offset servo field segment has an opposite polarity from a PES signal written on the second offset servo field segment.

12. A disk drive comprising:
    a slider including a read sensor and a write head;
    a servo system: and
    a rotatably mounted disk accessible by the read sensor and the write head, the disk having a set of tracks formed from concentric rings of thin film magnetic material separated by areas having no magnetic material, each track in the set including a plurality of servo sectors having at least first and second offset servo field segments, a centerline of the first and second offset servo field segments being offset from a track centerline, the set of tracks including a first group of adjacent tracks in which lengths of the first and second offset segments systematically change from track to track in a selected pattern to provide a unique servo signal pattern for each track in the first group of adjacent tracks and
    wherein the first and second offset servo field segments are separated by a non-offset PES segment, which is aligned with the track centerline, the length of the non-offset PES segment being inversely related to the combined length of first and second offset servo field segments in each servo sector.

13. The disk drive of claim 12 wherein the servo sectors include a track ID field that identifies the group of tracks.

14. A disk drive comprising:
a slider including a read sensor and a write head;
a servo system; and
a rotatably mounted disk accessible by the read sensor and the write head, the disk having a set of tracks formed from concentric rings of thin film magnetic material separated by areas having no magnetic material, each track in the set including a plurality of servo sectors having an In-PES segment, which is offset from a track centerline toward an inner diameter (ID) of the disk, and an Out-PES segment, which is offset from a track centerline toward an outer diameter (OD) of the disk, the set of tracks including a plurality of zones in which lengths of the In-PES and Out-PES segments are selected from a set of five or more lengths and systematically change from track to track in a selected pattern to provide a unique servo signal pattern for each track in the zone and wherein each zone includes eight or more tracks.

15. The disk drive of claim 14 wherein midpoints of the In-PES and Out-PES segments are aligned along first and second common centerlines in each servo sector.

16. The disk drive of claim 14 wherein the lengths of the In-PES and the Out-PES segments systematically change from track to track by no more than a maximum amount by having adjacent tracks have either a next longer length or a next shorter length selected from a set of allowed lengths.

17. The disk drive of claim 14 wherein a magnitude of a grain boundary angle between the In-PES and Out-PES segments on adjacent tracks is approximately constant for each pair of adjacent tracks.

18. The disk drive of claim 14 wherein the concentric rings include patterned magnetic islands in a concentric track arrangement.

19. The disk drive of claim 14 wherein the servo sectors include a PES-A signal written on a non-offset portion of the servo sector which is aligned with the track centerline, a PES-B signal written on the first offset servo field segment and PES-C signal written on the second offset servo field segment.

20. The disk drive of claim 19 wherein the PES-B and PES-C signals have opposite polarities.

* * * * *